United States Patent

Lee

[11] Patent Number: 5,926,385
[45] Date of Patent: Jul. 20, 1999

[54] FEEDBACK CONTROL METHOD FOR CHAOS SYSTEM USING ADAPTIVE TRACKING

[75] Inventor: Byoung Cheon Lee, Kyungki-Do, Rep. of Korea

[73] Assignee: LG Electronics Inc., Seoul, Rep. of Korea

[21] Appl. No.: 08/651,490

[22] Filed: May 22, 1996

[30] Foreign Application Priority Data

May 22, 1995 [KR] Rep. of Korea ................... 12782/1995

[51] Int. Cl.⁶ ................................................. G05B 13/02
[52] U.S. Cl. .......................... 364/158; 364/153; 364/154; 364/165
[58] Field of Search .................................. 364/152, 148, 364/154, 158, 159, 165, 176, 153, 164; 702/109; 706/903

[56] References Cited

U.S. PATENT DOCUMENTS

| 5,404,298 | 4/1995 | Wang et al. | 364/152 |
| 5,442,510 | 8/1995 | Schwartz et al. | 364/152 |
| 5,447,520 | 9/1995 | Spano et al. | 607/5 |
| 5,504,841 | 4/1996 | Tani | 395/81 |
| 5,510,976 | 4/1996 | Tanaka et al. | 364/148 |
| 5,522,863 | 6/1996 | Spano et al. | 607/45 |
| 5,602,964 | 2/1997 | Barrett | 395/24 |

OTHER PUBLICATIONS

González et al., A Remark on Chaotic Behavior in Adaptive Control Systems, IEEE Transactions on Automatic Control, vol. 39, No. 10, Oct. 1994, pp. 2145–2148.

Faramarz et al., Criteria for Chaos in Adaptive Ccontrol, Circuits and Systems, 1989 IEEE Midwest Symposium, pp. 120–123 vol. 1.

Salam et al., Complicated Dynamics of a Prototype Continuous—IEEE Transactions on Circuits and Time Adaptive Control System, Systems, vol. 35, No. 7, Jul. 1988, pp. 842–849.

*Primary Examiner*—Paul P. Gordon

[57] ABSTRACT

A feedback control method for a chaos system that automatically determines a control condition based on a control bifurcation (CB) phenomenon uses adaptive tracking to adjust control parameters based on an analysis of the output of the chaos system, and uses feedback to achieve a control condition based on the control parameters. Feedback control is performed irrespective of variations in the parameter of the chaos system. The feedback control method includes an adaptive tracking step for analyzing a chaos system output and for adaptively-tracking a value of a control parameter in accordance with the analyzed system output, and a feedback control step for performing feedback control to vary a system parameter and a state variable of the chaos system in accordance with the control parameter.

6 Claims, 8 Drawing Sheets

| CONTROL INPUT / CONTROL OUTPUT | x<br>$X_{F_0} = 2.7771$ | y<br>$X_{F_0} = 0.5473$ | z<br>$X_{F_0} = 4.2385$ |
|---|---|---|---|
| x | +0.937 | -3.170 | -0.454 |
| y | +(✳) | -8.100 | -0.805 |
| z | +1.410 | -6.540 | -0.833 |
| A | 0.364 | -1.000 | -0.184 |
| B | -0.384 | +5.600 | +0.165 |
| a | -0.099 | +0.490 | +0.053 |
| b | 0.326 | +1.470 | +0.214 |

(✳) +1.563 with d=1.8

FEEDBACK CONTROL METHOD FOR CHAOS SYSTEM USING ADAPTIVE TRACKING

BACKGROUND OF THE INVENTION

1. Field of the Invention

The present invention relates to a feedback control method for a chaos system using adaptive tracking, and more particularly to an improved feedback control method for a chaos system using adaptive tracking that is capable of automatically searching a control condition based on a control bifurcation (CB) phenomenon of a feedback control. The present invention is able to perform feedback control irrespective of variations of a parameter of a chaos system.

2. Description of the Conventional Art

Generally, the chaos characteristic is presented based on a nonlinear characteristic of a dynamics system. The nonlinear dynamics system having the above-mentioned chaos characteristic is called a "chaos system".

The chaos system is provided concurrently and hierarchically with various movements such as a chaos movement, a periodic movement and a fixed point movement, distinguishing it from conventional dynamics systems not having the chaos characteristic. The movements which distinguish a chaos system from conventional dynamics systems can be detected by analyzing the bifurcation phenomenon with respect to variation of the system parameter of the chaos system.

The bifurcation phenomenon is one of the important characteristics of the chaos system. Based on this phenomenon, it is possible to presume that a periodic resolution and a chaos-based resolution concurrently and hierarchically exist in one system.

The bifurcation can be expressed as a function of a certain system parameter. Assuming that the bifurcation is a system bifurcation (SB), this system bifurcation is referred to as a system itself.

Controlling the chaos system is referred to as stabilizing an unstable periodic orbit (UPO), which orbit is provided in the chaos attractor by slightly applying a perturbation to a parameter of the chaos system.

One feedback control method used in industry to stabilize a chaos system is known as the OGY method. The OGY method was disclosed in 1990 by Ott, Grebogy, and Yorke of the University of Maryland in the U.S.A. The OGY method applies a weak feedback perturbation to achieve a system parameter of the chaos system. As such, this feedback control method achieves control using many UPOs which are internally provided in the attractor. That is, the OGY method is evaluated as a theoretical basic principle of the chaos control.

Another feedback control method of the chaos system is known as an occasional proportional feedback (OPF) method disclosed by Hunt in 1991. The OPF method samples one time serial data at a sampling period T and applies a feedback control based on a difference between a sampled data and a reference point when the sampled data is positioned within the previously set control window. The method is easy to use and is adaptable to a high speed system.

Yet another feedback control method used to stabilize chaos systems is a return map method, disclosed by Peng and Pettrov in 1991. The return map method is directed to forming a return map from one-time serial data and performing feedback control to stabilize the UPO. The method is easy to use and has an advantage in using natural period of the system.

However, in the above-mentioned OGY method, various pre-analysis are necessary. That is, a disadvantage of the OGY system is that it requires the attractor to be reformed from the time serial data, the position of the UPOs to be analyzed by checking the data based on the Poincare cross-sectional surface and characteristics of the UPO which are determined in accordance with the variation of the system parameter.

The above-described OPF method, which samples based on a sampling period T, is also problematic in that it requires the period to be set to nearly match the natural period of the system. That is, since the method itself is not systematical, an experiment-based method is necessary.

A disadvantage of the conventional feedback control methods used in the conventional chaos systems is that the answer speed is low since complicated system analyzing processes must be performed with respect to the chaos system before performing the feedback control. The above-mentioned methods are therefore not useful for chaos systems requiring a quick answer time since the answering time is delayed due to the complicated system-analyzing processes.

SUMMARY OF THE INVENTION

Accordingly, it is an object of the present invention to provide a feedback control method for a chaos system using an adaptive tracking, which overcomes the problems encountered in a conventional feedback control method for a chaos system.

It is another object of the present invention to provide an improved feedback control method for a chaos system using adaptive tracking in which a control condition is automatically searched based on a control bifurcation (CB) phenomenon of a feedback control. As such, the improved feedback control performs feedback control irrespective of variations in chaos system parameters.

To achieve the above objects, there is provided a feedback control method for a chaos system using adaptive tracking, which includes an adaptive tracking step for analyzing a system answer of a chaos system and for adaptive tracking a value of a control parameter in accordance with the analyzed system answer; and a feedback control step for performing feedback control so as to vary a system parameter and a state variable of the chaos system in accordance with the control parameter which is adaptive-tracked in the adaptive tracking step.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
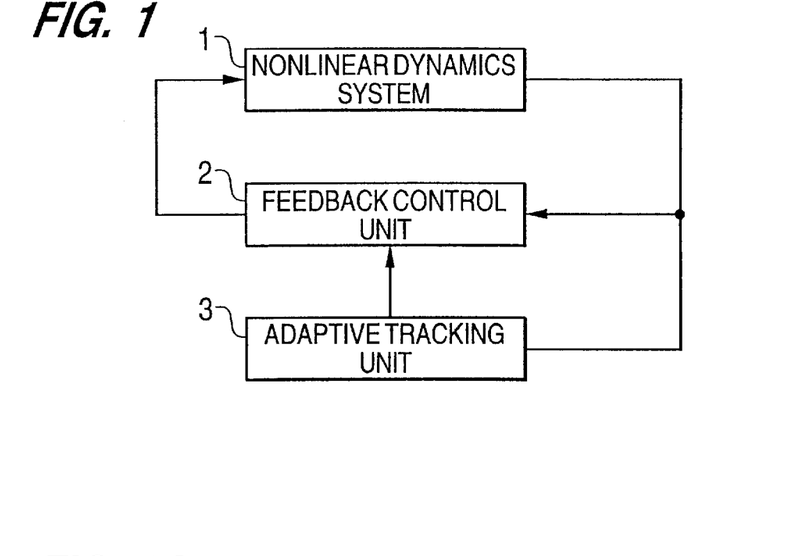
FIG. 1 is a block diagram of a chaos system adapted to the present invention.

FIG. 1 shows the chaos system adapted to the present invention. FIG. 1 includes a nonlinear dynamics system 1 having a chaos characteristic, a feedback control unit 2 and an adaptive tracking unit 3. Feedback control unit 2 has more than one control parameter. By analyzing information obtained from a predetermined time serial data outputted from the nonlinear dynamics system 1, feedback control unit 2 can perturbate the system parameter or the state variable of the nonlinear dynamics system 1. Adaptive tracking unit 3 analyzes the system answer of the nonlinear dynamics system 1 controlled by the feedback control unit 2 and adjusts the control parameter of the feedback control unit 2 when necessary.

The feedback control method of the chaos system using the adaptive tracking method of the present invention includes an adaptive tracking step for analyzing the system answer of the chaos system 1 and for adaptively tracking the value of the control parameter of the feedback control unit 2. It also includes a feedback control step for performing feedback control to vary the system parameter or the state variable of the chaos system 1 in accordance with the control parameter.

The process of the feedback control method using [an] adaptive [tracking of the present invention] will now be explained.

To begin with, the movement equation (or the state equation) of the conventional nonlinear dynamics system can be expressed as follows:

$$X = f(X, p) \quad (1),$$

where X denotes the state variable indicating the state of the nonlinear dynamics system 1, and p denotes the system parameter of the nonlinear dynamics system.

The nonlinear dynamics system 1 has a bifurcation characteristic Bif(X,p) from the periodic movement and the chaos movement. The bifurcation characteristic is derived in accordance with a variation of the system parameter.

The feedback control unit 2 controls the feedback operation of the nonlinear dynamics system 1. The control parameter of the feedback control unit 2, which is marked as "q" in FIG. 1, is determined in accordance with the state variable X of the nonlinear dynamics system 1 and the system parameter "p". The feedback control unit 2 generates feedback control signals based on the following expression (2) with references to a continuous control parameter "q" and the state variable "X", and varies the system parameter "p" of the nonlinear dynamics system 1 or the state variable "X", by inputting the feedback control signal to the nonlinear dynamics system 1:

$$p = g(X, q) \quad (2).$$

To control the feedback control unit 2, a predetermined feedback algorithm such as the OGY feedback control method, the Occasional Proportional Feedback (OPF) method, etc may be used.

When analyzing the bifurcation characteristic with respect to the control parameter "q" of the feedback control unit 2, the bifurcation characteristic Bif (X,q) is similar to the bifurcation Bif(X,p) of the nonlinear dynamics system 1.

This bifurcation is called a "control bifurcation". Using the above-mentioned control bifurcation, it is possible to properly control the nonlinear dynamics system 1 using feedback from the feedback control unit 2, to control the unstable periodic orbit (UPO) within the chaos attractor by slowly varying the control parameter of the feedback control unit 2, and to continuously control the entire chaos movement region.

That is, it is possible to allow the nonlinear dynamics system 1 to perform a desired movement by varying the control parameter "q" of the feedback control unit 2.

The adaptive tracking unit 3 is directed to varying the control parameter "q" of the feedback control unit 2 through a proper rule h(X) by analyzing the system answer of the nonlinear dynamics system 1.

There are various methods for analyzing the system answer of the nonlinear dynamics system 1 using the adaptive tracking unit 3. The most well known method involves forming a two-dimensional Poincare cross-sectional surface from the attractor, detecting the number of the movement orbits on the Poincare cross-sectional surface and the distribution thereof, and then analyzing the system answer. However, since the movement orbit is expressed in a two dimensional surface, the process of analyzing the system answer is complex.

There is an easier method, which involves computing on immediate maximum value or an immediate minimum value of the state variable by detecting a predetermined state variable, and analyzing the system answer based on the immediate maximum value and the immediate minimum value and the distribution of the same. Since this method is performed based on a one-dimensional Scaler, it is very simple; however, a disadvantage of this method is that other data may be mixed therein. To overcome the above-mentioned problem, the immediate maximum value or the immediate minimum value can be analyzed with respect to the state variable which is used in the two methods mentioned above.

According to the control bifurcation characteristic, there are two directions. One direction is directed toward the chaos attractor, and is based on the variation of the control parameter "q". The other direction is directed toward the periodic orbit and the fixed point movement. As the control bifurcation characteristic is advanced toward the periodic orbit direction, the maximum or minimum polar distribution is made narrower.

When the control bifurcation characteristic is controlled by the periodic orbit, it is possible to detect the period by counting the number of polar points.

Therefore, an easy method involves detecting the polar points of the state variable and the distribution of the polar points, and counting the number of the same.

In the adaptive tracking unit 3, the system answer of the nonlinear dynamics system 1 is analyzed by slightly varying the value of the control parameter toward the positive (+) direction or negative (−) direction from the value of the control parameter "q" that causes the feedback control signal of the feedback control unit 2 to become zero, thus judging which direction corresponds to the periodic movement.

Thereafter, the system answer generated by the nonlinear dynamics system 1 is analyzed through the distribution of the polar points while slowly varying the control parameter "q" in the periodic movement direction, and the adaptive tracking is continued so that the nonlinear dynamics system 1 can perform a corresponding periodic movement.

The feedback control method of the chaos system using the above-mentioned adaptive tracking will now be explained.

Figure 2A:
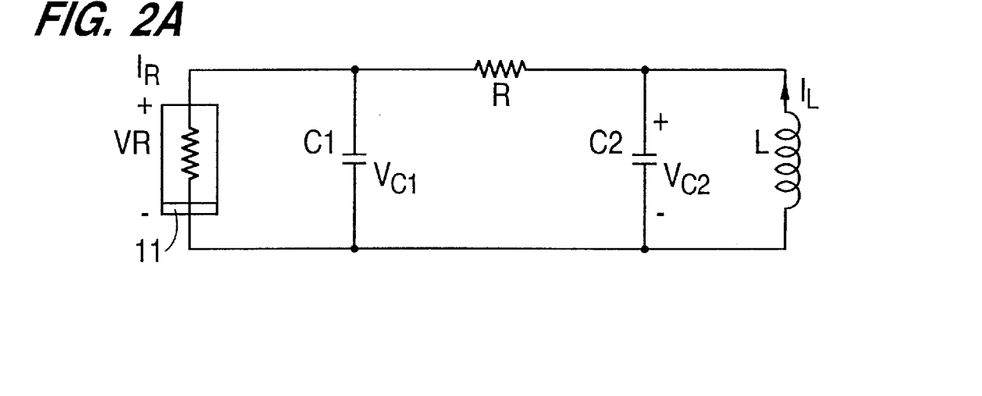
FIG. 2A is a circuit diagram of a nonlinear dynamics system of FIG. 1 according to the present invention.

To begin with, as shown in FIG. 2A, the nonlinear dynamics system 1 will now be explained with reference to the Chua circuit, and the feedback control unit 2 will now be explained with reference to the previously described OFF feedback control method. Here, the Chua circuit includes Chua diode 11, capacitors C1 and C2, and coil L. The Chua circuit shown in FIG. 2A represents the typical nonlinear dynamics system having various chaos characteristics.

Figure 2B:
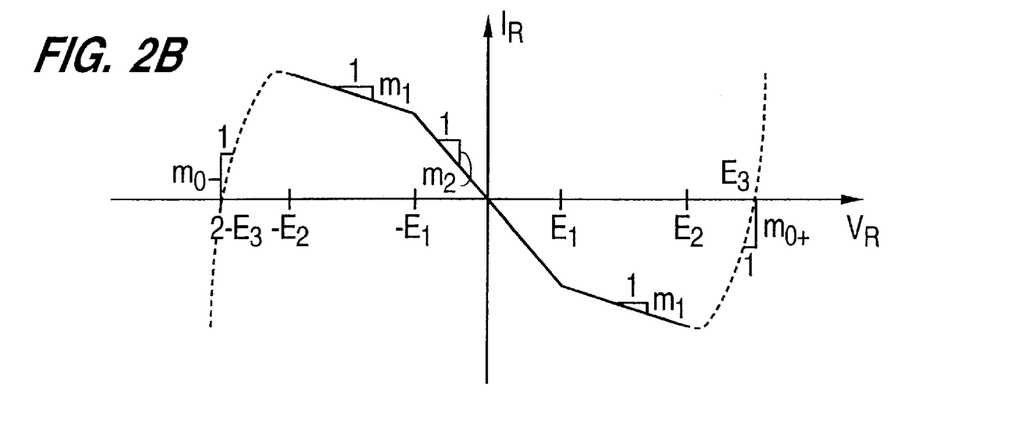
FIG. 2B is a diagram showing a relationship between voltage and current of the Chua diode of FIG. 2A according to the present invention.

FIG. 2B shows the voltage-current characteristic of the Chua diode 11.

The movement equation (or the state equation) of the Chua circuit is expressed as follows using a three dimensional movement equation having three state variables x, y, and z and four system parameters A, B, a, and b:

$$x=A(y-x-f(x))$$
$$y=x-y+z \quad (3),$$
$$z=-By$$

where $$f(x)=bx+\tfrac{1}{2}(a-b)(|x+1|-|x-1|)$$

Figure 3:
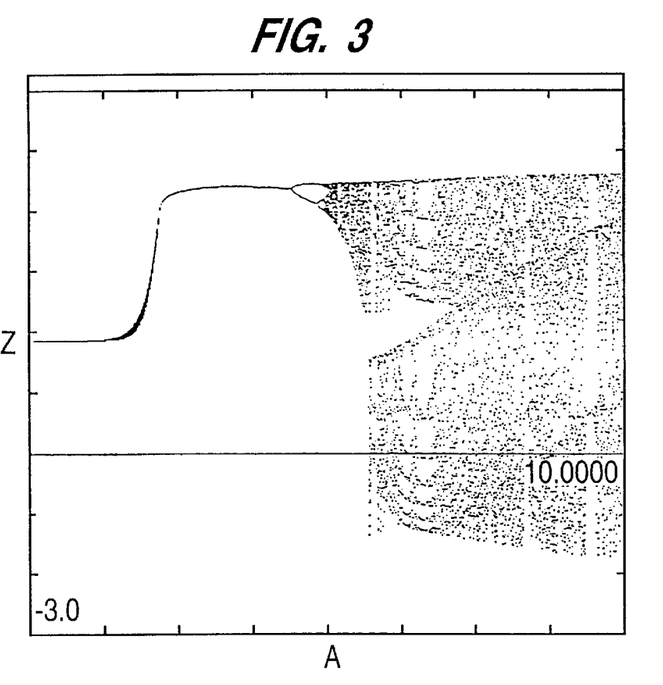
FIG. 3 is a diagram showing a bifurcation with respect to a system parameter of FIG. 2A according to the present invention.

The Chua circuit having the above-mentioned movement equation performs various movements, for example, a periodic movement, a single scroll attractor movement, a double scroll attractor movement, and the fixed point movement in accordance with the variation of four system parameters A, B, a, and b. As shown in FIG. 3, the movements are gleaned from the bifurcation with respect to the system parameter "A".

Thereafter, in the feedback control unit 2, the OPF feedback control method will now be explained. When the polar point of the time serial data received by feedback control unit 2 from the Chua circuit is within the set control window, the Chua circuit is feedback-controlled. Specifically, under these circumstances, the state variables x, y and z and the system parameters A, B, c and d can be varied via feedback control based on a feedback control amount C that is proportional to the difference $V_s-Zm$ between the center value $V_S$ of the control window and the polar point Zm of the obtained time serial data:

$$C=k(V_S-Zm) \quad (4),$$

where k denotes a proportional constant.

Here, when the expression $V_s-Vw<Zm<V_s+Vw$ is satisfied, the Chua circuit is feedback-controlled for the feedback time D, where Vw denotes the width of the control window.

As indicated by the expression above, it is possible to vary the chaos movement of the Chua circuit into the periodic movement by varying the value of the control parameter. In addition, as shown in FIG. 4 by the control bifurcation, it is possible to change a movement other than the periodic movement by slowly and continuously charging the value of the control parameter.

Figure 4:
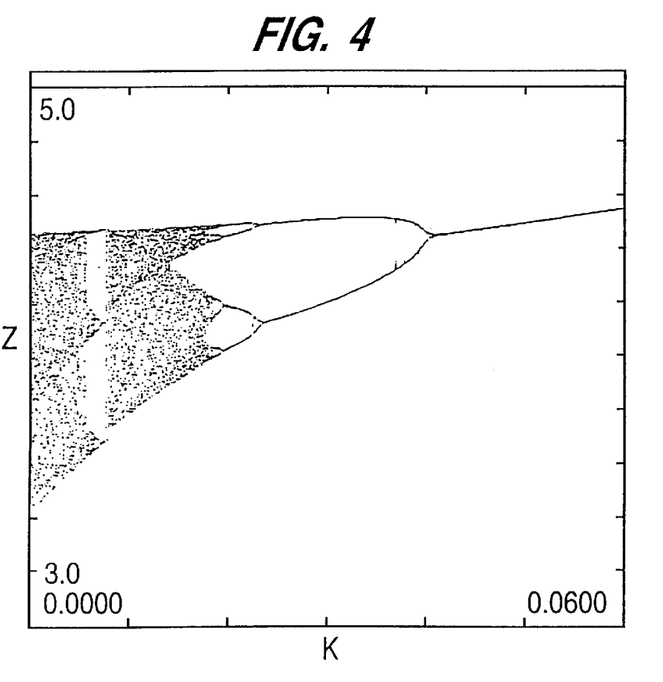
FIG. 4 is a diagram showing a control bifurcation with respect to a control parameter of a feedback control unit of FIG. 1 according to the present invention.

FIG. 4 shows an example of the feedback control with respect to the system parameter A from the state variable, where the horizontal axis corresponds to control parameter k, and the vertical axis corresponds to the distribution of the polar point with respect to the state variable z. That is, as is shown in the figure, at the point "k=0", where the amount of the feedback control C becomes zero (0), the chaos characteristic of the single scroll appears. However, the variation corresponding to periodic movement appears when increasing the control parameter k toward the positive direction (+).

In addition, when continuously controlling the periodic direction, it appears that the distribution of the polar point is made narrower. Therefore, pre-analysis, such as that required by the OGY feedback algorithm, is not necessary to start the feedback control. However, it is necessary to slightly vary the selected control parameter (here, K) toward the positive direction (+) or the negative direction (−) with respect to the point "k=0" where the amount of the feedback control becomes zero (0) for the feedback control, thus analyzing the system answer based on the distribution characteristic of the polar points and determining the control direction toward the periodic movement.

That is, the value of the control parameter k is varied based on the control direction toward the determined periodic movement until a desired periodic movement is performed.

The nonlinear dynamics system 1 will now be explained with reference to the Chua circuit, and the feedback control unit 2 will now be explained with reference to the return control map control method. In the feedback control unit 2, the return map is constructed based on the local maximum states from the time serial data outputted from the nonlinear dynamics system 1.

The VPO corresponds to the point where the data measured on the return map intersects the diagonal line of the $X_n=X_{n+m}$. The UPO can be stabilized by the feedback control. Assuming that the point on the return map corresponding to the UPO is $X_F$, and that the local linear approximation can be determined at the periphery of $X_F$, the following expression applies:

$$X_{n+1} \lambda(X_n-X_F)+X_F \text{ I} \quad (5),$$

where $X_n$ denotes "n"-th local maximum point, $X_F$ denotes the position of the UPO, and X denotes the proportional constant indicating the movement characteristic of the chaos system.

Meanwhile, assuming that the width of the control window is $X_w$, where $X_n$ is within the control window, the feedback perturbation shown in the following expression is applied to stabilize the UPO:

$$\delta P=k(X_n-X_F) \quad (6),$$

where the constant K can be expressed as follows:

$$k=\lambda(\lambda-1)(\delta X_F/\delta p) \quad (7)$$

The feedback perturbation, which can be expressed as shown in expression (7), is applied for a predetermined perturbation time "d" (kick time). The perturbation time "d" should be less than the natural period of the chaos system.

Here, the control parameters include the position $X_F$ of the UPO, the width $X_w$ of the control window, the proportional constant $k'$ and the perturbation time (kick time) $_d$.

These control parameters have two directions: the periodic direction and the chaos direction. These directions can be easily detected by testing a few test points at the periphery of each reference point.

That is, when applying the test feedback in one direction, the periodic direction is determined to correspond to the direction in which the answer region of the system is made narrower, and the chaos direction is determined to correspond to the direction in which the answer region is made wider.

In addition, the UPO is within the CB route, and the point is referred to as a predetermined point where the amount of the feedback perturbation becomes minimum. Therefore, when roughly knowing the periodic direction and the position of the UPO, it is possible to perform control.

To perform adaptive tracking of the UPO, the real time average $X^*$ and the real time deviation $\delta^*$ of the data within the control window of the return map must be computed.

The fixed point $X_F$ of the UPO is controlled to become the real time average $X^*$, and the proportional constant k is controlled along the periodic direction so that the real time deviation $\delta^*$ becomes minimum. The above-mentioned conditions can be expressed as follows:

$$X_F(n+1) = X_F(n) + a(X^* - X_F(n)) \quad (8),$$

and $$k(n+1) = k(n) + sgn(k(n)) \beta \delta^* \quad (9),$$

where $\alpha$ and $\beta$ denote control constants, and $sgn(k(n))$ denotes the periodic direction.

The return map feedback control method and an adaptive tracking method will now be explained in more detail.

For example, as an initial condition, the expression $X_{F1}$=4.2 is obtained by constructing the return map assuming the position of the UPO of one period (hereinafter, called the UPO$_1$). After applying a few test feedbacks, $k_1$=-0.1, the answer region of the system is narrowed, and the periodic direction is determined to be negative (-).

Figure 5:
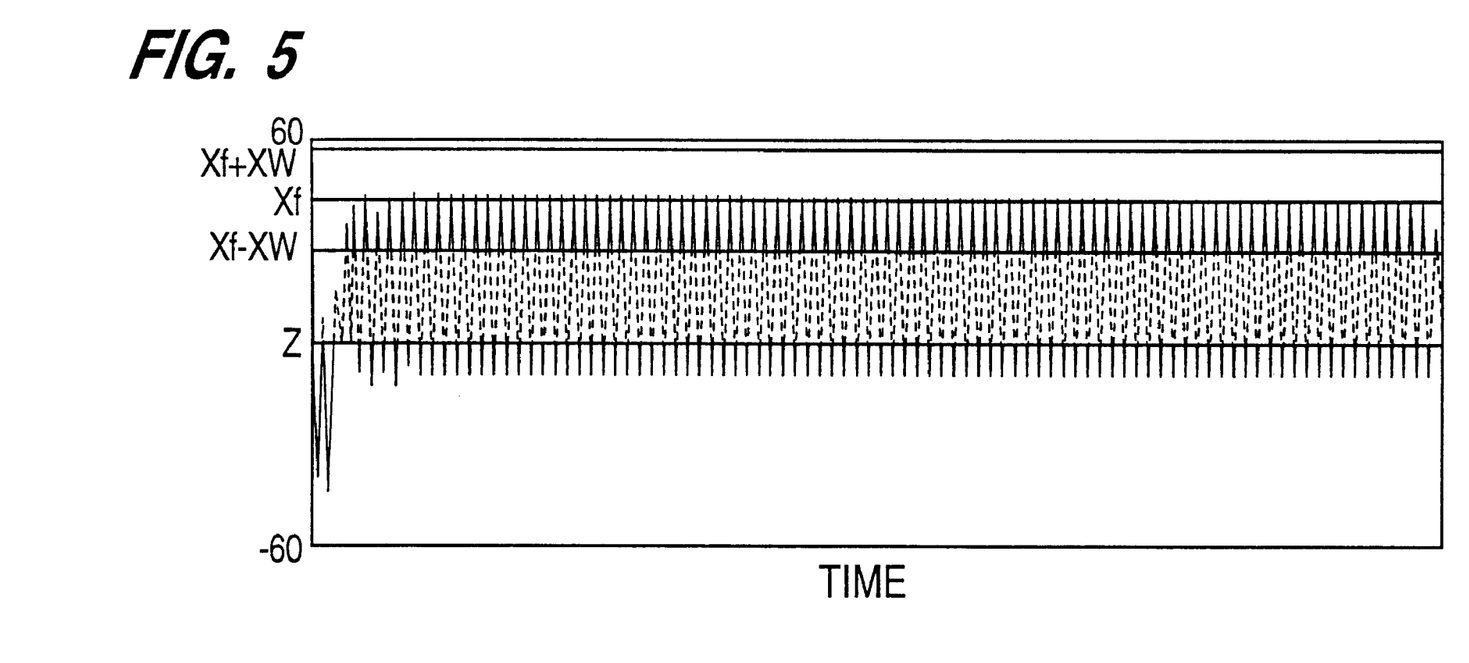
FIG. 5 is a diagram showing a result of an automatic control of an unstable periodic orbit of one period using a return map feedback control method and an adaptive tracking method of a feedback control unit and an adaptive control unit of FIG. 1 of the present invention.

When adaptive-tracking from the above-mentioned initial condition, UPO$_1$ is automatically searched and stabilized, as shown in FIG. 5. That is, the position $X_{F1}$ of the UPO$_1$ is continuously controlled, and the feedback control signal is rapidly converged toward zero (0). The control condition of the UPO$_1$, which is finally obtained as a result of the adaptive tracking, is "$X_{FO}$=4.2385, Ko=-0.2".

Figure 6A:
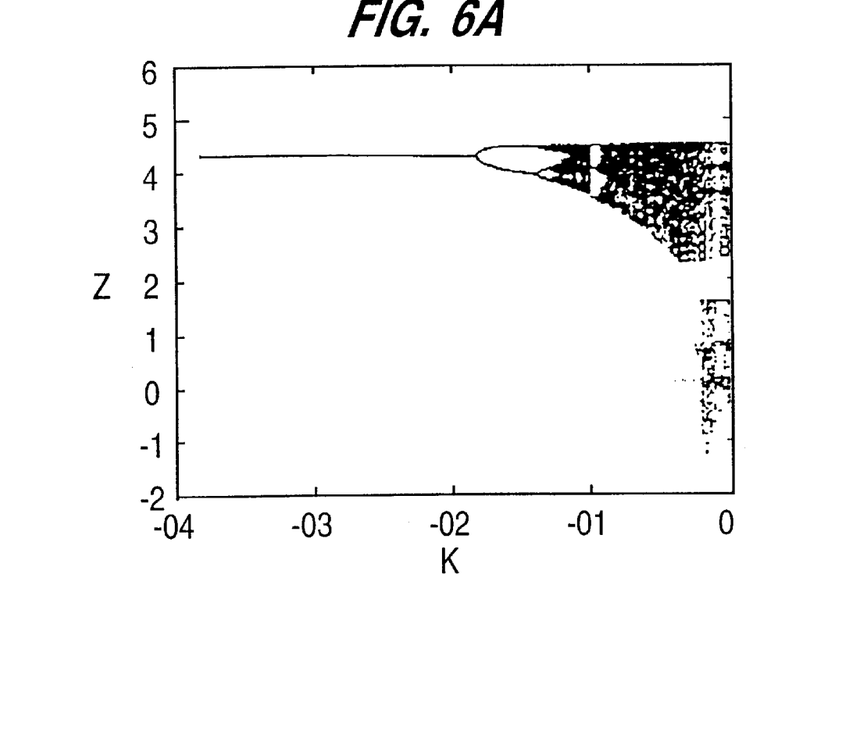
FIGS. 6A and 6B are diagrams showing a control bifurcation of an adaptive tracking unit of FIG. 1 according to the present invention.
Figure 6B:
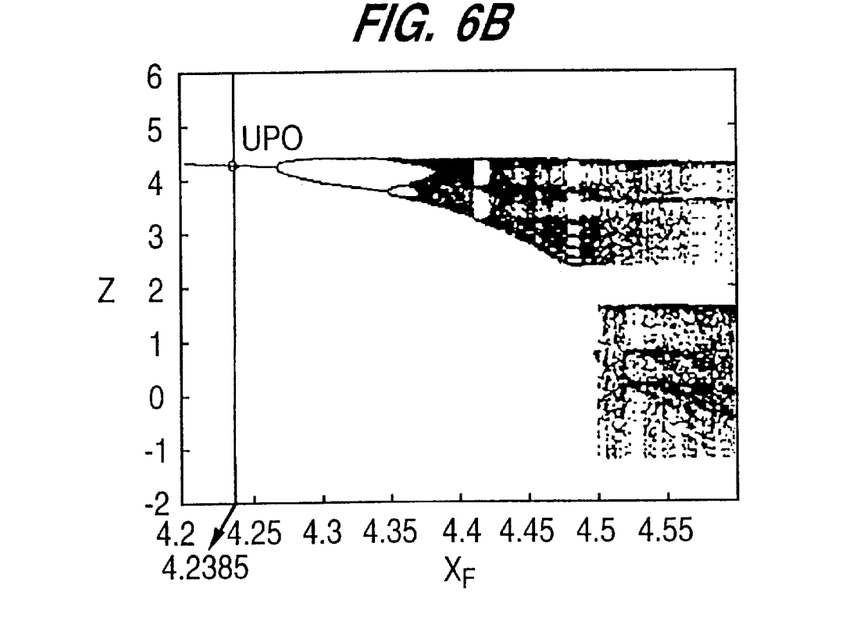

The CB phenomenon which appears when varying the $X_F$ and k at the periphery of $X_{FO}$ and $k_o$ is shown in FIGS. 6A and 6B. FIG. 6A shows the system answer when varying k from zero (0) to -0.4 by fixing the expression to be $X_F$=$X_{FO}$ as the k-mode CB. FIG. 6 shows the system answer when varying the $X_F$ from 4.2 to 4.6 by fixing the expression to be k=$k_o$ as the $X_F$- mode CB.

The above-mentioned CB phenomenon appears to have a predetermined systematic structure in the feedback control.

Figure 7A:
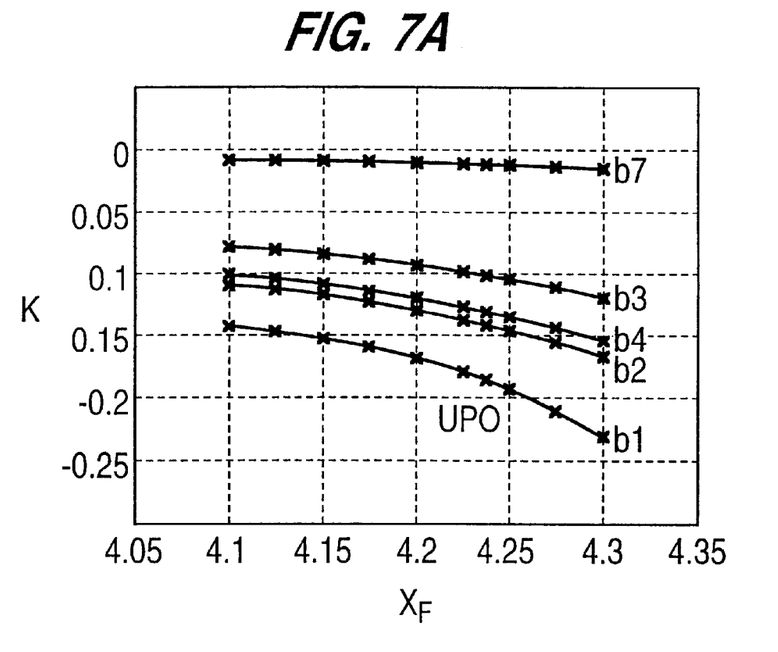
FIGS. 7A and 7B are diagrams showing the construction of a control bifurcation on a control parameter plane of an adaptive tracking unit of FIG. 1 according to the present invention.
Figure 7B:
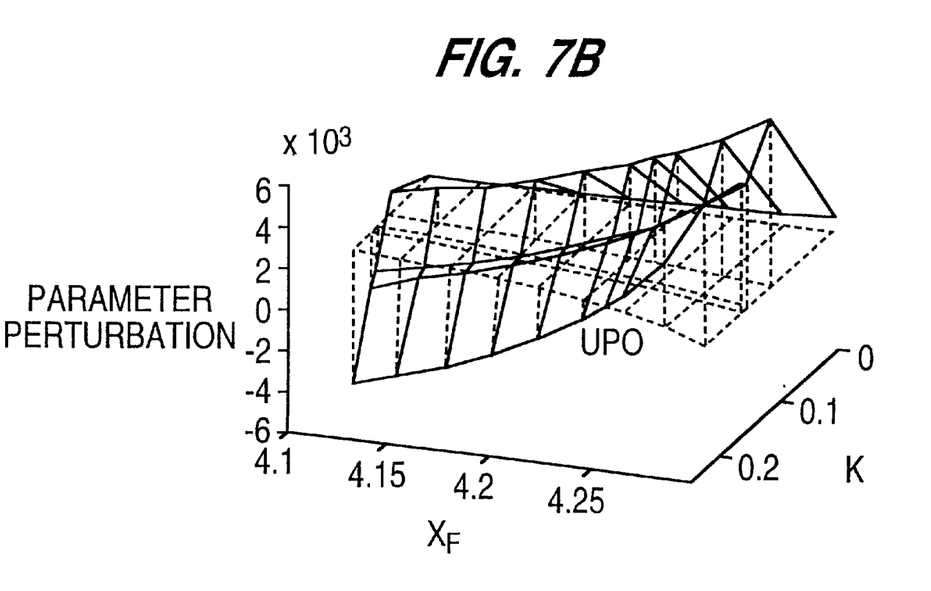

FIG. 7A shows the distribution of bifurcation toward each period on the control parameter plane, and FIG. 7B shows the average value of the feedback perturbation of each bifurcation point in three dimensions.

As shown in FIGS. 7A and 7B, the UPO is positioned at the center portion of the CB route, in which the feedback perturbation is converged toward zero (0). That is, the adaptive tracking method is directed to a method for automatically searching for the UPO which has the minimum perturbation along the CB route.

Another presumption made with respect to the CB phenomenon is that there exist a plurality of periodic orbits. That is, these periodic orbits are referred to as the driven periodic orbit (hereinafter, called the DPO) which is newly created in accordance with the feedback control.

Figure 8:
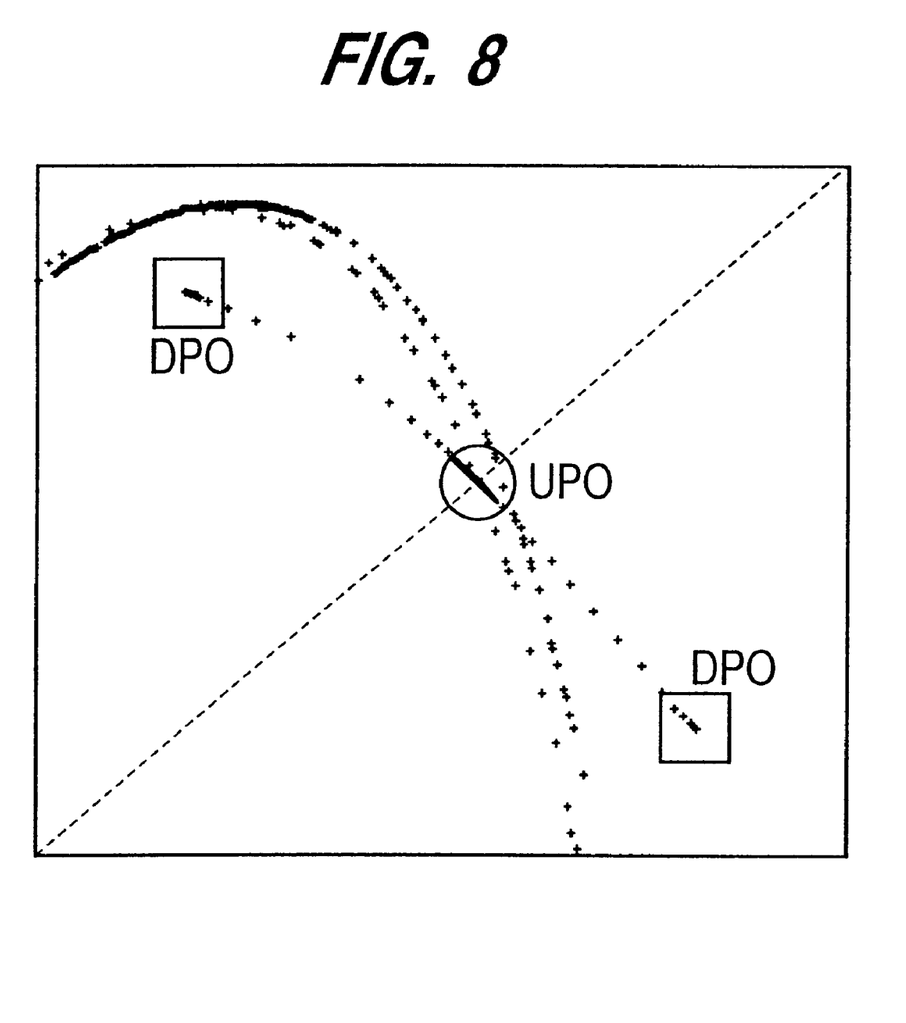
FIG. 8 is a diagram showing an unstable periodic orbit and an inductive periodic orbit which are present within a chaos attractor of a chaos system of FIG. 1 according to the present invention.

What is different between the DPO and the UPO, as shown in FIG. 8, is that the UPO represents the newly and externally created periodic orbit in the original attractor rather than the periodic orbit within the original attractor. Therefore, to create the DPO, it is necessary to add up to a predetermined amount of feedback perturbation rather than the average zero. When a periodic orbit other than UPO is necessary, and partial system changes are possible, control may be achieved using many DPOs around the UPO.

Figure 9A:
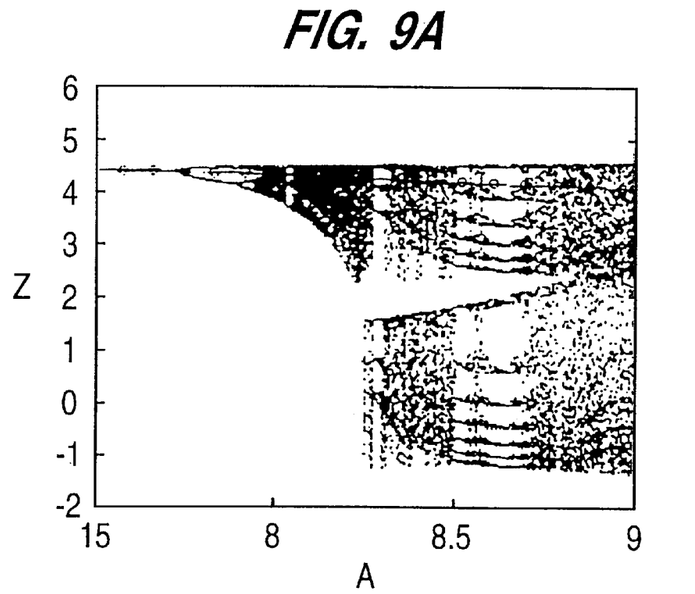
FIGS. 9A and 9B are diagrams showing a state variable with respect to a variation of a parameter of a chaos system of FIG. 1 according to the present invention.
Figure 9B:
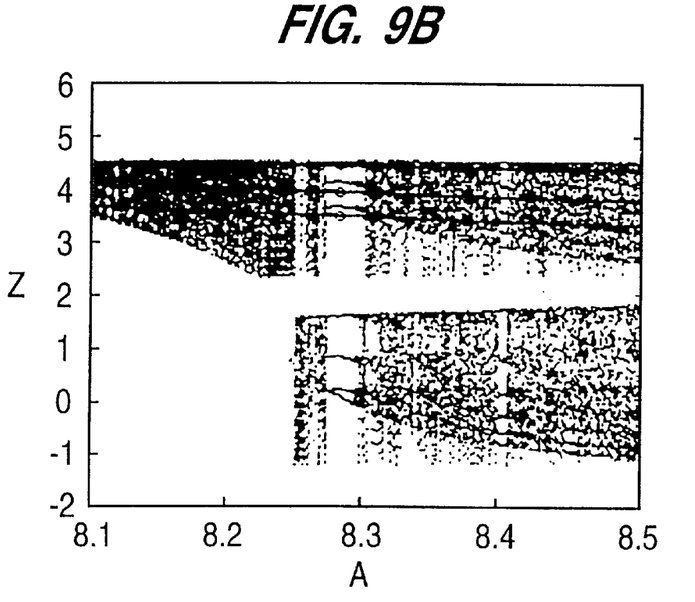

Meanwhile, as shown in FIGS. 9A and 9B, when the system parameter is slowly varied by adapting the adaptive tracking method, it is possible to maintain the feedback control. FIG. 9A shows the tracking of the UPO of one period, and FIG. 9B shows the tracking of the UPO of three periods.

The control condition of the feedback perturbation with respect to the system parameter A is explained above with the construction of the return map which is constructed from the state variable z.

The above-mentioned return map feedback control method may be adapted to other control inputs and other control outputs. A table of exemplary outputs generated by this method are shown in FIG. 10 In each case, the value k of the first bifurcation point is obtained via the adaptive tracking control method.

Figure 10:
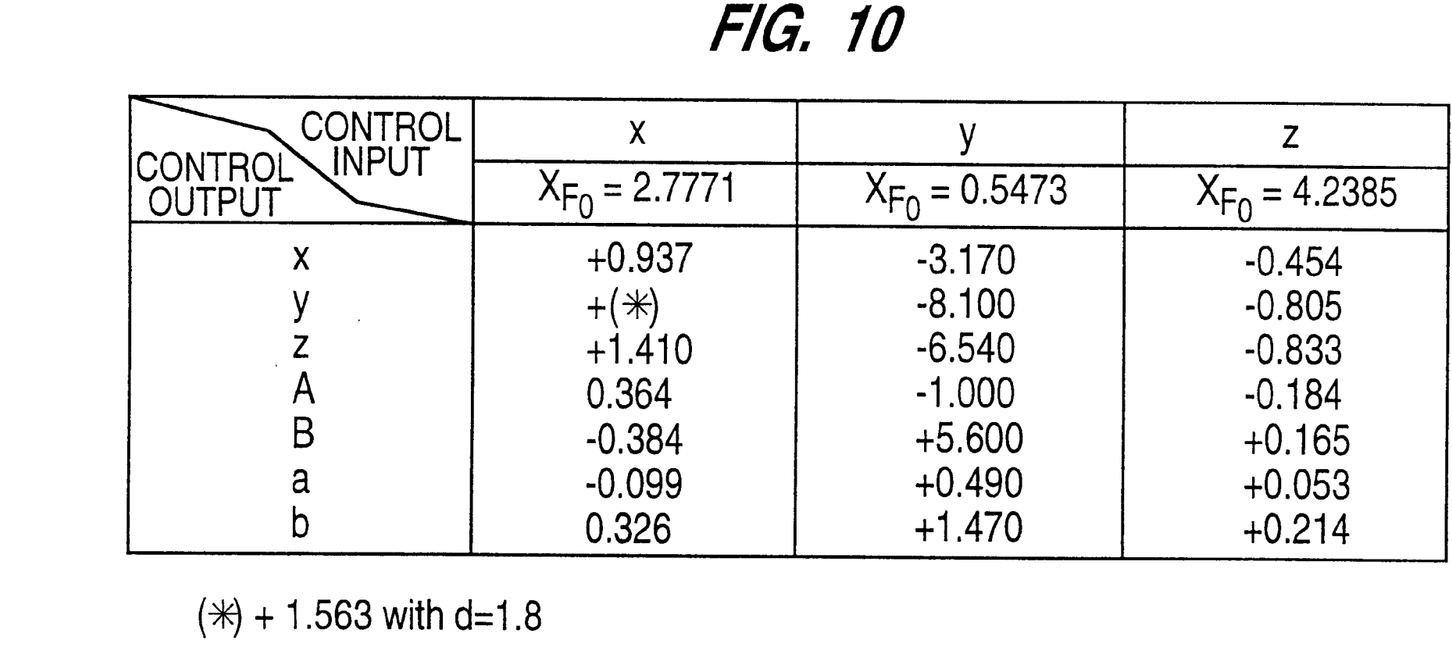
FIG. 10 is a table of values of a control parameter in accordance with a variation of a parameter and a state variable of a chaos system of FIG. 1 according to the present invention.

As shown in FIG. 10, when stabilizing the UPO of one period, it is possible to use various control inputs and control outputs based on perturbations such as the parameter perturbation and the state variable perturbation.

As described above, the feedback control method of the chaos system using the adaptive tracking of the present invention is directed to automatically searching and stabilizing the accurate control condition using an adaptive tracking method after detecting the information and periodic direction with respect to the position of the UPO, thus more easily controlling the feedback control irrespective of the pre-analysis.

In addition, it is possible to maintain feedback control through adaptive tracking control when the system is slightly changed, thus continuously maintaining the control of the desired orbit, irrespective of the changes of the system parameter.

When the control target is changed, it is possible to more easily control the desired adaptive tracking when changing the control of two periods to four periods.

A more systematic control method can be achieved using many UPOs existing around the chaos attractor as well as a control to the UPO.

The feedback control method for a chaos system using an adaptive tracking can be adapted to a predetermined experiment-based system of which the movement equation is not well known. Furthermore, it is possible to achieve control in the periodic direction and the chaos direction using one system. As such, the invention can be used to more systematically control the dynamics including the chaos phenomenon.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A feedback control method comprising:

adaptively tracking a control parameter by analyzing a non-linear system output; and varying at least one of a system parameter and a state variable of the non-linear system in accordance with the control parameter using a return map feedback control method, where a return map is formed by the return map control method when a local maximum point is within a control window.

2. A feedback control method comprising:

adaptively tracking a control parameter based on a non-linear system output by obtaining an immediate maximum value and or an immediate minimum value of a predetermined state variable, analyzing the number of the immediate maximum value and the immediate minimum value and the distribution of the same, and analyzing the system answer; and varying at least one of a system parameter and state variable of the non-linear system in accordance with the control parameter.

3. A feedback control method comprising:

adaptively tracking a control parameter based on a non-linear system output by determining a periodic direction with respect to the control parameter by analyzing time serial data which is obtained in accordance with feedback control when controlling a periodic orbit, and controlling the control parameter in a direction that converges toward zero by analyzing an average of a feedback perturbation and a reference deviation in real time; and varying at least one of a system parameter and a state variable of the non-linear system in accordance with the control parameter wherein a point of the periodic orbit is adjusted to become the average of the feedback perturbation which is analyzed in real time, and is adjusted to minimize the reference deviation of the feedback perturbation which is analyzed in real time.

4. A feedback control method comprising:

adaptively tracking a control parameter by analyzing a chaos system output; and varying at least one of a system parameter and a state variable of the chaos system in accordance with the control parameter, wherein the varying step includes varying the system parameter and the state variable of the chaos system in accordance with the control parameter.

5. A feedback control method comprising:

adaptively tracking a control parameter by analyzing a non-linear system output; and varying a system parameter and a state variable of the non-linear system in accordance with the control parameter.

6. A feedback control method for a non-linear system, comprising:

determining a control parameter for the non-linear system based on a bifurcation characteristic of an output from the non-linear system, the bifurcation characteristic comprising a system parameter and a state variable;

generating feedback based on the control parameters; and adjusting the system parameter and state variable based on the feedback.

* * * * *